United States Patent [19]

Yuasa et al.

[11] 4,449,822

[45] May 22, 1984

[54] EXPOSURE INDICATOR

[75] Inventors: Yoshio Yuasa, Kawachinagano; Kazuhiko Naruse, Sakai, both of Japan

[73] Assignee: Minolta Camera Kabushiki Kaisha, Osaka, Japan

[21] Appl. No.: 324,955

[22] Filed: Nov. 25, 1981

[30] Foreign Application Priority Data

Nov. 28, 1980 [JP] Japan .................. 55-168951

[51] Int. Cl.³ .............................................. G01J 1/42
[52] U.S. Cl. ................................. 356/227; 354/289.12; 354/474
[58] Field of Search ............... 356/218, 219, 223, 226, 356/227; 354/53, 60 L, 289, 58; 355/38; 364/525

[56] References Cited

U.S. PATENT DOCUMENTS 3,843,249 10/1974 Kitaura ........................... 354/289 X
4,032,933 6/1977 Ito et al. ........................... 354/53 X
4,176,955 12/1979 Yamada et al. .
4,182,573 1/1980 Yamada et al. .
4,229,108 10/1980 Childers ........................... 356/223 X

FOREIGN PATENT DOCUMENTS 55-35316 3/1980 Japan .
55-40451 3/1980 Japan .

Primary Examiner—Vincent P. McGraw
Assistant Examiner—L. A. Dietert
Attorney, Agent, or Firm—Watson, Cole, Grindle & Watson

[57] ABSTRACT

An exposure indicator for use in a light meter includes a light measuring device including a light receiving element for producing an electrical signal representing the brightness of the light received by the light receiving element, and a circuit for changing the electrical signal from the light measuring device by an amount determined by a setting mechanism. A first indicator is provided for indicating a value of an exposure parameter, such as an aperture F-stop value, based on the changed signal, and a second indicator is provided for indicating a density of a reproduced film in accordance with the electrical signal from the light measuring device and the changed signal.

22 Claims, 7 Drawing Figures

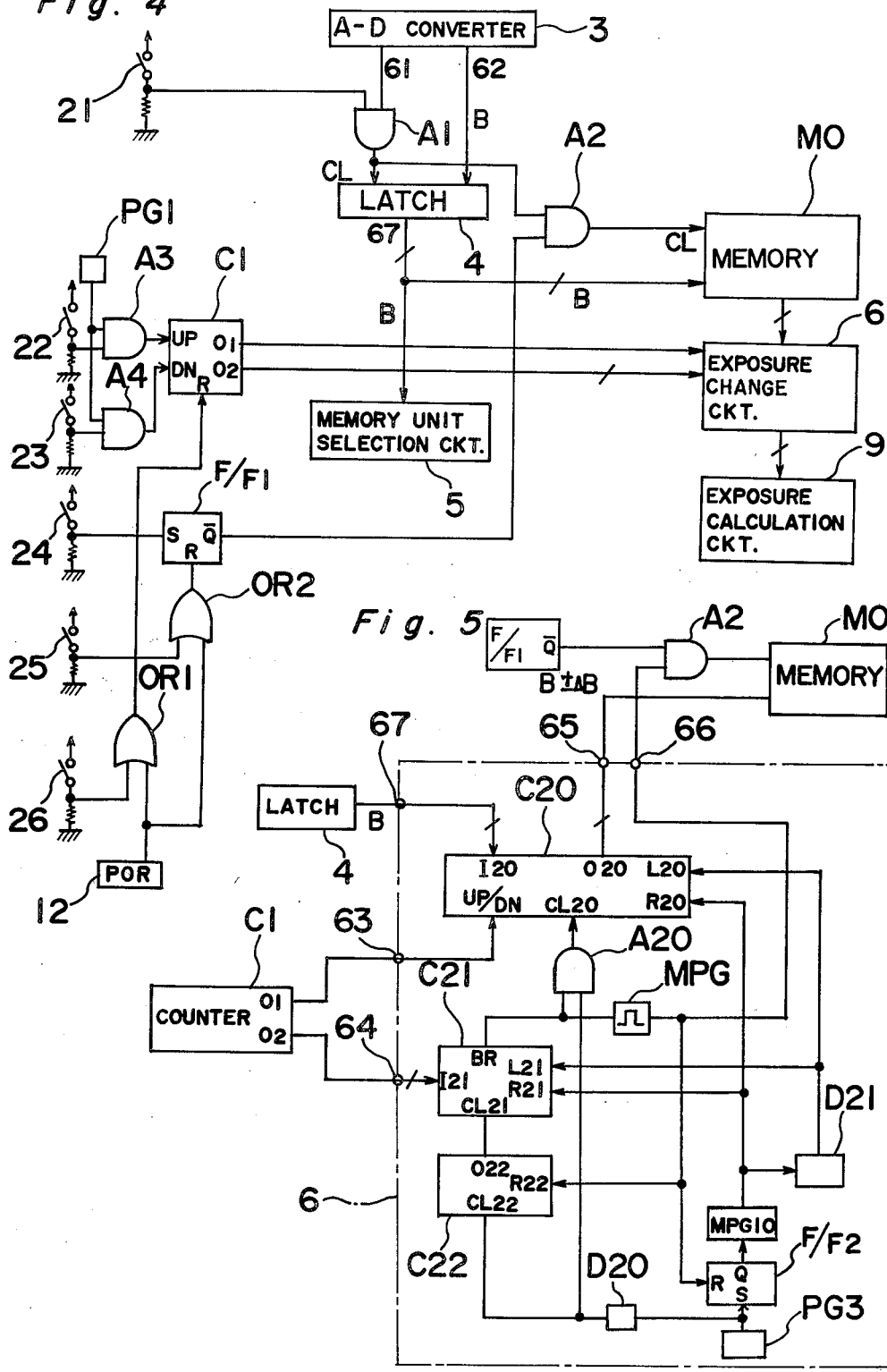

EXPOSURE INDICATOR

BACKGROUND OF THE INVENTION

1. Field of the Invention

The present invention relates to a light meter and, more particularly, to an exposure indicator for providing a photographer with information of exposure condition based on light measurement.

2. Description of the Prior Art

As is well known to those skilled in the art of photography, in taking a picture of a target object exposure parameters are set in a camera such that the resultant picture shows a tone graduation corresponding to that of the target object. So far as an exposure value or a combination of a shutter speed and aperture value for a measured object brightness and a given film speed, is calculated by a light meter either of a separate or built-in type, the exposure setting according to the exposure value so calculated will generally present an agreeable picture wherein the image of the target object on a film will be reproduced as having a tone graduation sufficient to show every detail of the target object.

However, it often occurs that some ardent photographers as well as professional photographers wish to obtain pictures having either highlight or shadow areas reproduced more clearly in an attempt, for example, to produce a creative and artistic image according to his or her intention. This is usually done by setting at the photographer's will exposure parameters to values that deviate from the proper combination indicated by the light meter. This gives rise to a problem, so far as in the prior art light meter, that it is very difficult to determine the degree of change in the exposure parameters. Therefore, when the photographer wishes to change the reproduced tone darker or lighter, he (or she) must determine the amount of change relying on his experience.

Further, it is known to determine an exposure setting in accordance with light measurement of a portion of a scene or object to be photographed. If the portion to be measured is remote from the user, he or she may use a light meter with a narrow light acceptance angle, such as a spot meter. If the user can approach the portion, he or she may use an incident type light meter or any conventional light meter with a relatively large light acceptance angle. In any cases, the prior art light meters have generally been designed to indicate such an exposure parameter or condition that the measured portion will be reproduced on a film with a half or middle tone or density when a picture is taken with the indicated value. However, professional and advance amateur photographers sometimes wish to know such an exposure setting that a desired portion of a scene will be reproduced to a desired tone or density.

Some exposure meters have been proposed which indicate not only a proper exposure condition but a difference of brightnesses at a plurality of measured portions, or a difference of the values of an exposure parameter that are proper for respective measured portions, or a difference set or intended exposure condition and an exposure condition that is proper for a measured portion. (See U.S. Pat. Nos. 4,182,573 and 4,176,955 and U.S. patent application Ser. No. 69,835 which has been allowed. All the patent and patent applications have been assigned to the same assignee as that of the present invention.) With those exposure of light meters, one may be able to know whether or not the measured portion will be outside of a latitude range of a film with a proper exposure mode, or how much different exposure will be given to each measured portion. However, he or she can not know the tone or density with which the measured portion will be reproduced on a film when the latter is exposed with a certain exposure condition.

SUMMARY OF THE INVENTION

It is a primary object of the present invention to provide an exposure indicator which can indicate reproduction tone or density anticipated from a light measurement.

It is another object of the present invention to provide an exposure indicator of the above described type which can indicate a plurality of reproduction tones or density at the same time for the spots in the object having different brightness, with respect to any exposure value selected by the operator It is a further object of the present invention to provide an exposure indicator of the above described type which can be accommodated in a light meter of incident type or reflected type.

It is still another object of the present invention to provide an exposure indicator which indicates difference between or among a plurality of light measurements with a parameter of reproduction tone or density.

It is yet another object of the present invention to provide an exposure indicator which indicates difference of a light measurement from a selected exposure condition, with a parameter of reproduction tone or density.

It is a still further object of the present invention to provide an exposure indicator of the above described type which is simple in construction and can readily be manufactured.

According to the present invention, an exposure indicator comprises a light measuring means which receives light to be measured, such as light reflected from or incident on an object to be photographed, and which produces an electric signal as a function of the amount or intensity of the received light, and further comprises a setting means for generating a change signal representative of a set amount of change to be made to the electric signal, a changing means for changing the level of the electric signal in response to the change signal from the setting means, a first indication means for indicating an exposure condition or a value of an exposure parameter in response to the changed electric signal, and a second indication means for indicating, in response to the change signal, a specific point on a tone or density graduation as a function of the amount of change.

In one embodiment according to the above mentioned present invention, an exposure indicator further comprises a storage means for storing the electric signal from the light measuring circuit and a comparison means for detecting the amount of difference between the stored signal and the changed signal, the second indication means is responsive to the output of the comparison means to indicate a specific point on a tone or density graduation as a function of the amount of the difference. The comparison means may further detect the amount of difference between the changed electric signal and the electric signal directly supplied from the light measuring means as a function of the light being received. The storage means may store a plurality of the electric signals from the light measuring circuit corresponding to a plurality of light measurements. In this case, a selection means should selectively transmit and direct the stored electric signals to the comparator.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIG. 4 is a circuit diagram showing a modification of the circuit shown in FIG. 2;

FIG. 5 is a circuit diagram showing a detail of the exposure change circuit shown in FIGS. 2 and 4;

DESCRIPTION OF THE PREFERRED EMBODIMENT

Figure 3:
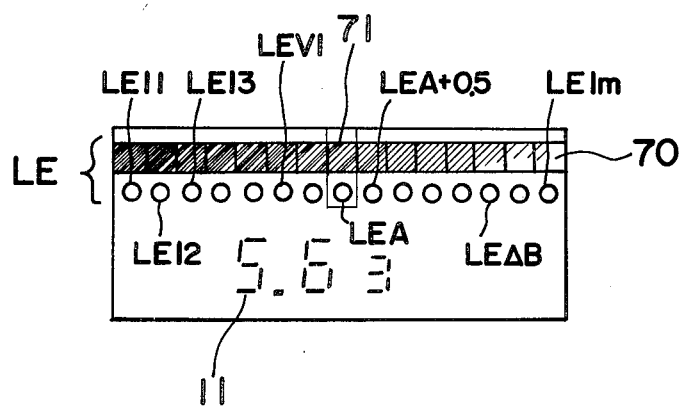
FIG. 3 is a front view of a display unit showing a specific arrangement of a dot indicator and a segment indicator.

Referring to FIG. 3, there is shown an exemplary appearance of a display unit employed in an exposure indicator according to the present invention. The display unit has a density chart 70 at the upper side of the display unit showing a graduation of reproduction tones wherein the right-most block shows the lightest highlight tone and the left-most block shows the darkest shadow tone. A block indicated by a reference numeral 71 shows a middle or half-tone. Circles shown under each tone block are dots formed by light emitting elements, such as light emitting diodes LE11 to LE1m (m is a positive integer.). The density chart 70 and the dots define a dot indicator LE. The display unit further has a segment indicator at a position shown by 11 and, in the example shown, the segment indicator 11 is showing F-stop number 5.6. A numeral 3 shown on the right-hand side of the F-stop number 5.6 shows that the actual F-stop number is 0.3 steps higher than 5.6 according to the APEX unit, the 0.1 step corresponding to one tenth of the difference between f:5.6 and f:8.0. The manner in which the dot indicator LE and the segment indicator 11 are actuated will be described hereinbelow.

Figure 1:
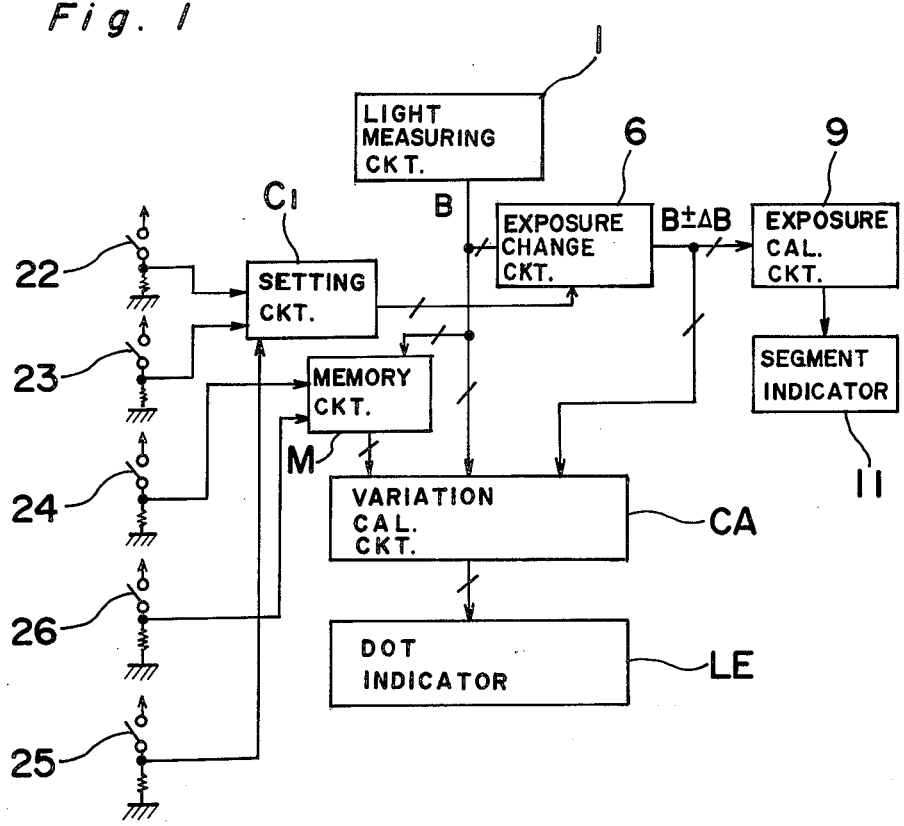
FIG. 1 is a block diagram of an exposure indicator according to the present invention.

Referring to FIG. 1, there is shown a block diagram of a circuit for an exposure indicator according to the present invention. It is to be noted that in the drawings of FIGS. 1, 2, 4, 5 and 6, a virgule provided in a lead line indicates that the lead line is defined by a bundle of lines capable of carrying binary coded signals of a plurality of bits. In FIG. 1, a reference numeral 1 designates a light measuring circuit for receiving light incident on, or reflected from, a target object and for producing a light intensity signal B which corresponds to the logarithm of the received light intensity or amount. It is to be noted that the light measuring circuit 1 can be of a type having a light receiving optical system capable of measuring light in a narrow light acceptance angle, as in a spot meter, or a type capable of measuring a wide light acceptance angle as in an integration type light meter. In the embodiment disclosed herein, it is described as a narrow angle measuring type. A reference numeral 6 designates an exposure change circuit for changing the value or level of the light intensity signal B obtained from the light measuring circuit 1. The exposure change circuit 6 is coupled with a setting circuit C1, defined by, e.g., an up/down counter, for setting a number that determines an amount of change to be made to the light intensity signal. The setting circuit C1 is connected to normally-open switches 22, 23 and 25. The switch 22 is provided in association with an up-control button (not shown), and when it is closed, the amount carried in the setting circuit C1 increases. The switch 23 is provided in association with a down-control button (not shown), and when it is closed, the amount carried in the setting circuit C1 decreases. The switch 25 is provided in association with a reset-button (not shown), and when it is closed, the amount in the setting circuit C1 is reset to zero. Accordingly, the setting circuit C1 may carry any one of a positive amount, a negative amount or zero, and such an amount is used for changing, in the exposure change circuit 6, the light intensity signal B obtained from the light measuring circuit 1.

The value or amount carried by the setting circuit C1 may be made not zero when the operator wishes an over or under exposure than the exposure corresponding to the signal from the light measuring circuit 1, the latter signal being generally used to provide an exposure condition that is normally considered as proper. The over or under exposure may be set for a photographic object with unusual light conditions or for a creative and/or artistic photographs.

The exposure change circuit 6 produces a changed light intensity signal $B \pm \Delta B$ which is applied to an exposure calculation circuit 9. The exposure calculation circuit 9 calculates a value of an exposure parameter, such as an exposure value, an aperture value or an exposure time value. In the embodiment disclosed herein, the exposure calculation circuit 9 is so designed to calculate an aperture value as a function of the measured light intensity or amount and preselected film speed and exposure time values. The calculated aperture value is displayed through the segment indicator 11 in a form of an F-stop number plus a numeral representing a decimal of the aperture value in an APEX unit.

In the case where the setting circuit C1 is producing a signal representing zero, the brightness signal B obtained from the light measuring circuit 1 is applied to the exposure calculation circuit 9 without any change. In this case, the segment indicator 11 shows an F-stop number, with which the measured spot on the object can be reproduced as a half-tone on a film.

On the other hand, when the setting circuit C1 is producing a signal representing a not-zero positive value, the brightness signal B obtained from the light measuring circuit 1 is changed in the exposure change circuit 6 to a changed light intensity signal $B - \Delta B$. This is because more exposure is given for less value of light measurement. When the setting circuit C1 is producing a signal representing a negative value, the brightness signal B is changed to $B + \Delta B$. It is to be noted that although, in the embodiment, the light intensity signal is reduced for the positive value of setting in the setting circuit and vice-versa, since the setting means sets the amount of exposure to be changed, the circuit may be modified to increase the light intensity signal for the positive value of setting if the setting is defined to mean the amount of light measured to be changed. In this case, the negative value should be used for changing the brightness signal from B to B−ΔB. The degree of change −ΔB or +ΔB is determined by the amount of positive or negative value set in the setting circuit C1. When the light intensity signal is changed by ±ΔB, the exposure calculation circuit 9 calculates an appropriate aperture value for the changed light intensity signal B±ΔB, and the segment indicator 11 shows an F-stop number and a decimal of the aperture value with which the measured spot can be photographed as a brighter or darker tone than the half-tone. The degree of how brighter or darker the tone will be is displayed through the dot indicator LE, as will become apparent from the description below.

Still referring to FIG. 1, a reference character CA designates a variation calculation circuit for calculating an amount of difference between brightness signal B obtained from the light measuring circuit 1 and the changed light intensity signal B±ΔB obtained from the exposure change circuit 6. The signal representing the calculated amount f(±ΔB) is applied to a dot indicator LE for lighting one light emitting diode such that when there is no change, i.e., ΔB=0, a center light emitting diode LEA is lit, designating a block 71 in the density chart 70 showing half-tone. When the change is not zero, i.e., ΔB≠0, a light emitting diode which will be lit differs from the center light emitting diode LEA for designating a block in the density chart 70 other than the half-tone. The signs + and − of the change ΔB determine the direction of deviation of the density indication from the center light emitting diode LEA, whether towards the brighter region or darker region, and the amount of change ΔB determines the degree of the deviation.

A reference character M designates a memory or storage circuit connected to a normally-open switch 24. The switch 24 is provided in association with a memory button (not shown), and when it is closed, the memory circuit M is so actuated as to receive and store the light intensity signal being supplied from the light measuring circuit 1 upon the closure of the switch 24. The memory circuit M is defined by a plurality of memory units capable of storing a plurality of light intensity signals being supplied at different times.

The variation calculation circuit CA may calculate, other than the above described calculation, an amount of difference between each light intensity signal stored in the memory circuit M and the changed light intensity signal from the exposure change circuit 6. It is to be noted that the changed light intensity signal from the circuit 6 is stored in a memory means (not shown in FIG. 1) which is independent of the memory circuit M. The calculated amounts of differences are fed to the dot indicator LE. Thus, the dot indicator LE is actuated such that a plurality of light emitting diodes can be lit at the same time.

At the time of power on, the setting circuit C1 is initially set to zero. Then when a spot is measured by the light measuring circuit 1, the center dot indicating the half-tone is lit no matter what the measured brightness is, while tha segment indicator 11 indicates an F stop number and a decimal of its aperture value corresponding to the output of the light measuring circuit. Then, when the switch 22 or 23 is turned on, the value in the setting circuit C1 increases or decreases from zero, and accordingly, the F-stop number shown in the segment indicator 11 changes, and at the same time, the dot which is lit is altered from the center dot. The operator may continue to hold the switch 22 or 23 in the on state until a dot which represents his or her desired tone is lit. When the switch 22 or 23 is turned off, a dot representing the desired tone continues to light, and the segment indicator 11 shows such an F-stop number that when the object is photographed with the indicated F-stop number, the aimed spot in the object will be reproduced with the desired tone indicated by the dot which is being lit.

Thereafter, upon closure of the switch 24, the memory circuit M stores the brightness signal from the light measuring circuit 1. If the operator aims at another spot, the light measuring circuit 1 can measure the brightness of that spot. In this case, the dot indicator LE is so actuated as to light another dot which represents a tone with which the another spot will be reproduced on the film, if a photograph is taken with the F-stop number shown in the segment indicator 11. Therefore, by observing the dot indication, the operator can previously understand how dark or light the spots will be reproduced on the film, and thus, it is possible for him or her to determine a desired F-stop number according to his or her creative artistic intention.

Figure 2:
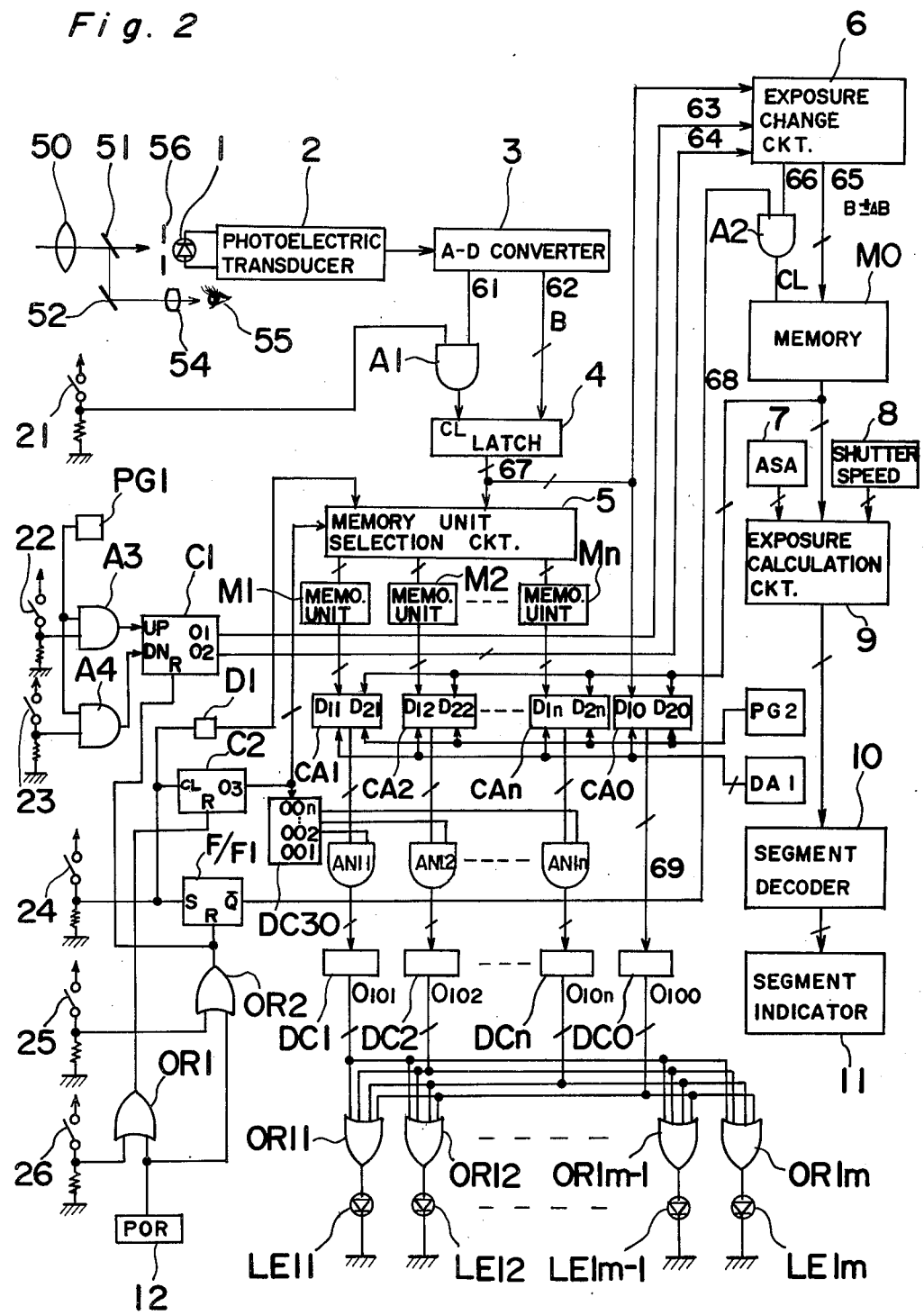
FIG. 2 is a circuit diagram of a preferred embodiment of the present invention.

Referring to FIG. 2, there is shown a circuit diagram of the photographic exposure indicator according to a preferred embodiment of the present invention. The exposure indicator is designed to measure the brightness of a portion of an object to be photographed. A reference numeral 50 designates an objective lens. The light which has passed through the objective lens 50 is reflected on mirrors 51 and 52 and forms an image which can be viewed by an eye 55 through an eyepiece 54. Of the light which has passed through the objective lens 50, some percentage passes through the mirror 51 and is focused on an aperture plate 56 having an aperture size to provide with the light measuring system a narrow viewing light acceptance angle, such as 1°, so as to allow spot measuring by a light receiving element 1. The light receiving element 1 is connected to a Bv signal generation circuit 2, and the element 1 and circuit 2 operate in such a manner as to convert the intensity of the light received by the light receiving element 1 into a voltage signal which is proportional to a logarithm of the intensity of received light, that is, the circuit 2 generates a voltage signal representing APEX index Bv which corresponds to the brightness of the measured spot on the object.

A reference numeral 3 designates an analog-to-digital converter (A-D converter), and it is provided for converting analog signal obtained from the Bv signal generation circuit 2 to a digital brightness signal B, which is generated from output terminal 62. The A-D converter 3 also produces a completion signal from terminal 61 each time upon completion of A-D conversion. The output terminal 62 is connected to a latch 4, and the output terminal 61 is connected to an input terminal of an AND gate A1. The other input terminal of the AND gate A1 is also connected to a normally-open switch 21 which is provided in association with a light measuring button (not shown). The output of the AND gate A1 is connected to a clock terminal CL of the latch 4. Accordingly, the completion signal produced from the output terminal 61 can be applied to the clock terminal CL of the latch 4 only when the light measuring switch 21 is on. The switch 21 is hereinafter referred to as a light measuring switch 21. When the latch 4 receives the completion signal, it holds data of a light intensity value Bv, i.e., the brightness signal B being produced from the A-D converter 3 at that time. The brightness signal B held in the latch 4 is passed to the exposure change circuit 6, which has its other input terminals connected to the output terminals O1 and O2 of up-/down counter C1.

The counter C1 consists of a plurality of counters, and it operates such that the number possessed by the counter C1 increases one by one, by a train of pulses applied to its input terminal UP and decreases similarly by a train of pulses applied to its input terminal DN. The output terminal O2 produces an absolute value of the number stored in the counter C1 and the output terminal O1 produces a low or high level signal indicating positive or negative, respectively. For example, if the number stored in the counter C1 is $-5$, the output terminal O1 produces a high level signal representing negative, and the output terminal O2 produces a binary coded signal 101 representing 5.

When the exposure change circuit 6 receives a signal corresponding to some number from the terminal O2 of the counter C1 and a high level signal from the terminal O1, the value of the brightness signal B obtained from the latch 4 is subtracted by a value determined by the number signal received from the counter C1.

However, when the exposure change circuit 6 receives a signal of some number and a low level signal from the terminals O2 and O1 of the counter C1, respectively, to the value of the brightness signal B is added a value determined by that number.

The brightness signal B changed by the subtraction or addition of a value determined by the number obtained from the counter C1, hereinafter referred to as a changed brightness signal $B \pm \Delta B$, is produced from a terminal 65 of the exposure change circuit 6.

The up/down counter C1 has a reset terminal R which receives a pulse produced, in response to the power supply, by a power-on reset circuit (POR circuit) 12. When the reset terminal R receives the pulse, the counter C1 is turned to such a state that the terminal O1 produces a low level signal and the terminal O2 produces a binary coded signal representing zero. A switch 22 is coupled to an up-control button (not shown), and is connected to an AND gate A3. The switch 22 is hereinafter referred to as an up switch 22. The other input of the AND gate A3 is connected to a pulse generator PG1, and the output of the AND gate A3 is connected to an up-count terminal UP of the counter C1. Accordingly, when the up switch 22 is turned on, a train of pulses produced from the pulse generator PG1 is applied through the AND gate A3 to the counter C1, causing counting up operation in the counter C1. In this case, if the counted number possessed in the counter C1 is positive, the terminal O1 is at a low level signal, and if it is negative, the terminal O1 is at a high level signal The switch 23 is coupled to a down-control button (not shown), and is connected to an AND gate A4. The switch 23 is hereinafter referred to as a down switch 23. The other input of the AND gate A4 is connected to the pulse generator PG1, and the output of the AND gate A4 is connected to a down-count terminal DN of the counter C1. Accordingly, when the down switch 23 is turned on, a train of pulses produced from the pulse generator PG1 is applied through the AND gate A4 to the counter C1, causing counting down operation in the counter C1.

The switch 25, which is coupled to a reset button (not shown) and therefore referred to as a reset switch 25, is connected through an OR gate OR2 to the reset terminal R of the counter C1. When the reset switch 25 is turned on, the counter C1 is reset, and accordingly, the terminal O1 produces a low level signal and the terminal O2 produces a binary coded signal of zero. The exposure change circuit 6 produces, when the calculation for the change is completed, a completion signal from terminal 66. The completion signal produced from the circuit 6 is applied through an AND gate A2 to a clock terminal CL of a memory MO so that the memory MO receives and holds the changed brightness signal $B \pm \Delta B$ from the change circuit 6. The AND gate A2 is controlled by a signal obtained from $\overline{Q}$ terminal of a flip-flop F/F1 which also has a set terminal S and a reset terminal R. Since the reset terminal R of the flip-flop F/F1 receives a pulse from the POR circuit 12 through the OR gate OR2, the $\overline{Q}$ terminal is at a high level signal when the power is supplied, and remains at a high level signal until the switch 24 closes. The switch 24 is coupled to a memory button (not shown) and therefore it is referred to as a memory switch 24, hereinbelow.

When the memory switch 24 closes, the flip-flop F/F1 is turned to a set condition, and accordingly, its $\overline{Q}$ terminal produces a low level signal. Thus, the AND gate A2 intercepts the transmission of the completion signal to the memory MO, resulting in no more renewing operation of changed brightness signal $B \pm \Delta B$ in the memory MO. It is to be noted that the flip-flop F/F1 is turned to a reset condition when the reset switch 25 is closed.

The changed brightness signal $B \pm \Delta B$ stored in the memory MO is passed on to the exposure calculation circuit 9 for calculating an F-stop number (aperture value) as a function of film speed (ASA number) obtained from an ASA setting circuit 7 and shutter speed obtained from a time setting circuit 8.

The signal corresponding to the F-stop number calculated in the exposure calculation circuit 9 is applied to a segment decoder 10, and is displayed through the segment indicator 11.

Still referring to FIG. 2, a reference numeral 5 designates a memory unit selection circuit for selecting one of memory units M1, M2, . . . , and Mn (n is a positive integer) according to the signal obtained from the memory switch 24, and for supplying the brightness signal B held in the latch 4 to a selected memory unit. A reference character C2 designates an up counter having a clock terminal CL for receiving turn-on signals obtained from the memory switch 24. The up counter C2 counts up as it receives a turn-on signal from the switch 24. The output 03 of the counter C2 is connected to the memory unit selection circuit 5 for supplying the signal representing the number counted in the counter C2. In addition to the clock terminal CL of the counter C2, the memory switch 24 is also connected to a delay circuit D1, which is in turn connected to the memory unit selection circuit 5. Thus, the memory unit selection circuit 5 operates in such a manner that it first selects one of memory units M1, M2, . . . , and Mn according to the number counted in the counter C2, and then when it receives a signal from the delay circuit D1, the brightness signal B held in the latch 4 is passed on through the selection circuit 5 to the selected memory unit M1. For example, when the memory switch 24 is turned on for the second time, the counter C2 counts up to two, and accordingly, the memory unit selection circuit 5 selects the second memory unit M2. A very short period after the second turning on operation of the memory switch 24, the delay circuit D1 produces a signal which causes the transmittal of the brightness signal B from the latch 4 through the memory selection circuit 5 to the second memory unit M2.

The counter C2 further has a reset terminal R which is connected through OR gate OR1 to the POR circuit 12. Therefore, when the power is supplied, the POR circuit 12 produces a pulse which resets the counter C2. When the counter C2 is reset, it produces a signal of zero from its terminal 03. The OR gate OR1 is also connected to a switch 26, which is coupled to a clear button and thus it is referred to as a clear switch 26, so that the counter C2 can also be reset by the closure of the clear switch 26.

Reference characters CA0, CA1, CA2, ..., and CAn designate difference or variation calculation circuits, and each of which is connected to a pulse generator PG2 and also to a data setting circuit DA1. By the pulse generated in the pulse generator PG2, a data A previously set in the data setting circuit DA1 is supplied to each of the variation calculation circuits CA0, CA1, CA2, ..., and CAn. In each variation calculation circuit CA0 to CAn, to the data A obtained from the data setting circuit DA1 is added the data of the brightness signal B obtained from the corresponding memory unit M1 to Mn, and then is further subtracted by the data of the changed brightness signal $B \pm \Delta B$ obtained from the memory MO. When the above described variation calculation completes, the variation calculation circuit CA0 supplies the calculated amount of variation, or difference, directly to a decoder DC0, whereas the other variation calculation circuits CA1 to CAn supply the calculated amount of differences, or variations, to decoders DC1 to DCn, respectively, through AND gates AN11 to AN1n. These AND gates AN11 to AN1n are provided to permit the transmittal of calculated data to the decoders only from the variation calculation circuits which are provided with brightness signal B from the corresponding memory circuits M1 to Mn. To this end, there is provided a decoder DC30 having n outputs 001 to 00n which are connected, respectively, to the input of the AND gates AN11 to AN1n. The input of the decoder DC30 is connected to the output O3 of the counter C2 so that the decoder DC30 produces a high level signal only from output terminals whose designated reference number are equal to or smaller than the number possessed by the counter C2. For example, when the counter C2 is carrying a number two, the decoder DC30 produces a high level signal only from its outputs 001 and 002. The remaining outputs 003 to 00n produce a low level signal. In this case, only the decoders DC1 and DC2 receive calculated difference amount signal from the variation calculation circuits CA1 and CA2, respectively. Other decoders DC3 to DCn receive a low level signal from AND gates A13 to A1n, respectively.

The decoders DC0 to DCn have outputs O100 to O10n, respectively, and each output is defined by m (m is a positive integer.) taps. Each of the decoders DC0 to DCn operate such that it produces a high level signal only from one tap according to the calculated amount of difference obtained from the corresponding variation calculation circuit and produces a low level signal from the remaining taps. The data applied to each decoder DC0 to DCn is presented with an accuracy of the order of 0.1 Ev, whereas the data produced from each decoder DC0 to DCn is presented with an accuracy of the order of 0.3 Ev to 0.5 Ev order. It is to be noted that the description below is directed to a case when the accuracy of the output data from the decoders DC0 to DCn is represented on the order of 0.5 Ev.

The outputs O100, O101, O102, ..., O10n of the decoders DC0, DC1, DC2, ..., DCn are connected respectively to indicating elements, such as light emitting diodes LE11, LE12, ..., LE1m through OR gates OR11, OR12, ..., OR1m. When the decoders DC0, DC1, ..., DCn receive calculated variation from the corresponding variation calculation circuits CA0, CA1, ..., CAn, each decoder produces a high level signal from its one tap causing light emission from the corresponding indicating element. It is needless to say that when a decoder or decoders is receiving a low level signal, such a decoder or decoders produces no high level signal from any one of its output taps, causing no light emission from any of the indicating elements.

The arrangement of the display unit shown in FIG. 3 can be employed in the embodiment described above. In this case, the blocks in density chart 70 show different reproduced tones on a film obtained when it is exposed is different exposure values changed in the order of 0.5 Ev. The dot indicators are defined by the indicating elements and are aligned along the density chart 70 with one dot registered with one block. The block 71 in the center of the density chart 70 shows the half-tone. It is to be noted that the block 71 showing the half-tone should not necessarily be located at the center of the density chart 70. The segment indicator 11 is provided for showing F-stop number in digital form.

Now, a thorough operation of the exposure indicator of the embodiment described above is given below with reference to FIGS. 2 and 3.

When a main switch (not shown) is turned on to supply power, the POR circuit 12 produces a pulse which resets counters C1 and C2 and flip-flop F/F1. Then, when the light measuring switch 21 is turned on, the latch 4 receives and holds a brightness signal B, in a digital form, of a spot on an object. The brightness signal B held in the latch 4 is passed on to the exposure change circuit 6. Since the counter C1 is, at this moment, in the reset condition, it is producing a low level signal from its output terminal O1 and binary coded signal of zero from its output terminal O2. Thus, the brightness signal B applied to the exposure change circuit 6 from the latch 4 is passed on, without any change, to the memory MO. Thereafter, the exposure change circuit 6 produces from its output 66 a completion signal. Since the flip-flop F/F1 is, at this moment, in the reset condition producing a high level signal from its $\overline{Q}$ terminal, the completion signal from the change circuit 6 passes through the AND gate A2 and is applied to a clock terminal CL of the memory MO, causing memory MO to store the changed brightness signal $B \pm \Delta B$ (Since no change is carried out at this moment, $\Delta B$ is zero. Thus, the signal applied to the memory MO at this moment should be stated as an unchanged brightness signal B rather than changed brightness signal $B \pm \Delta B$.) from the exposure change circuit 6. The brightness signal B stored in the memory MO is fed to the exposure calculation circuit 9 in which the data of the brightness signal B is associated with data of film speed from the ASA setting circuit 7 and data of shutter speed from the time setting circuit 8, for calculating the F-stop number. The calculated F-stop number is displayed through the segment indicator 11 in a digital form.

The brightness signal B produced from the latch 4 is also applied to the input D10 of the variation calculation circuit CA0, and the brightness signal B produced from the memory MO is also applied to the input D20 of the variation calculation circuit CA0. Then, when a pulse is produced from the pulse generator PG2, the data A stored in the data setting circuit DA1 is applied to the variation calculation circuit CA0. In the variation calculation circuit CA0, to the data A is added the data of the brightness signal B from the latch 4 and from its result is subtracted the data of the brightness signal B from the memory MO. Since the brightness signal B from the latch 4 is, in this case, substantially equal to the brightness signal B, the variation calculation circuit CA0 produces a signal representing the data A. This data A is applied to the decoder CA0, and the decoder DC0 is so actuated as to lit the center dot indicator LEA representing the half-tone. As understood from the above, the data setting circuit DA1 is carrying data corresponding to the half-tone.

Therefore, at the moment when the light measuring switch 21 is turned on, the segment indicator 11 displays an F-stop number which will provide a reproduction of the measured spot with a half-tone indicated by the dot indicator LE. This means that when the aimed at target object is photographed with the F-stop number shown in the indicator 11 as well as with the selected or set film speed and shutter speed, a spot on the film corresponding to the aimed spot of the object will be reproduced on a film as a half-tone represented by the density shown in the block 71.

If the photographer, according to his or her creative intention, wishes to make the image of the aimed spot to be brighter or darker than the half-tone, he or she may change the amount of exposure, and this can be accomplished by changing the F-stop number or shutter speed. The operation described below is directed to a case when the F-stop number is changed for creating a highlight tone, i.e., a tone which is brighter than the half-tone, for the aimed spot.

After the above described operation, the up switch 22 is turned on. During the closure of the switch 22, a train of pulses produced from the pulse generator PG1 is applied to up-count terminal UP of the counter C1. Thus, the counter C1 counts up the number of pulses applied thereto from zero, and it produces data representing the counted number of pulses from its output terminal O2 in a form of binary coded signal. For example, if the counter C1 has received a single pulse from the pulse generator PG1, it counts up to 1 and produces data representing 1 from the terminal O2 to the exposure change circuit 6. In this case, since the counted number 1 is positive, the output terminal O1 of the counter C1 produces a low level signal. In the exposure change circuit 6, the number obtained from the counter C1 is weighted by, i.e., multiplied by a predetermined exposure value given in the APEX index, for example, 0.5 Ev, and the obtained product is subtracted from the brightness signal B representing the data of light intensity value Bv. Therefore, according to the example given above, the exposure change circuit 6 carries out a calculation of (data of light intensity value Bv)$-1 \times 0.5$ Ev. (1)

A signal corresponding to the remainder, that is the changed brightness signal $B - \Delta B$, is produced from the terminal 65 and transferred to the memory MO in response to the completion signal from the circuit 6. The changed brightness signal $B - \Delta B$ stored in the memory MO is applied to the exposure calculation circuit 9 which thereupon calculates F-stop number, and the calculated the F-stop number is displayed through the segment indicator 11.

The changed brightness signal $B - \Delta B$ memorized in the memory MO is also applied to the variation calculation circuit CAO. In the circuit CAO, to the data A received from the data setting circuit DA1 is added data of the brightness signal B obtained from the latch 4, and from the sum is subtracted the changed brightness signal $B - \Delta B$ from the memory MO. According to the above, the changed amount $-\Delta B$ is substantially equal to $-0.5$ Ev. Thus, the variation calculation circuit CAO produces data representing a value $A + 0.5$, which is applied to the decoder DC0. When the decoder DC0 receives a signal of the data of $A + 0.5$, it produces a high level signal from a tap corresponding to $A + 0.5$. In this case, since the dot indicators are explained as aligned with a pitch corresponding to 0.5 Ev, a dot positioned next to the center dot LEA and designated by a reference character $LEA + 0.5$ in FIG. 3 is lit. Therefore, when the aimed the target object is photographed with the F-stop number shown in the segment indicator 11, a spot on the film corresponding to the aimed at spot in the object will be reproduced on a film with a slightly highlight tone. In other words, the spot on the film will be overexposed by 0.5 Ev and the density of the film on the spot will become as light as that shown in the block of density chart 70 indicated by the dot $LEA + 0.5$.

It is to be noted that, since the calculation procedure is carried out in the circuits 6, 9 and CAO very fast, the segment indicator 11 and dot indicator LE renew the indication immediately after the generation of one pulse from the pulse generator PG1. Therefore, when the up switch 22 is maintained closed to receive a plurality of pulses from the pulse generator PG1, it is possible to observe the change of indication in the indicator 11 and LE. More specifically, in the segment indicator 11, it is possible to show the increase of F-stop number by the amount corresponding to 0.5 Ev, and in the dot indicator LE, it is possible to show the change of dot being lit from the center towards right-hand direction in FIG. 3. When a dot representing the intended film density is lit, the up switch 22 is turned off for holding the segment indicator 11 to show a particular F-stop number. When a photograph is taken with the indicated F-stop number, the spot on the film corresponding to the aimed at spot in the object will be reproduced with the intended highlight tone identical to that shown in the block of density chart 70 indicated by the lit dot.

The steps to obtain exposure value capable of reproducing the spot on the film with a shadow tone, that is a tone darker than the half-tone, can be carried out by the closure of the down switch 23, in a similar manner as described above.

Next, another mode of operation using the memory units is explained from the very beginning of the operation.

When the main switch (not shown) is turned on, the POR circuit 12 produces a pulse that resets counters C1 and C2 and flip-flop F/F1. Then, when the light measuring switch 21 is turned on while aiming at a first spot on the object, the latch 4 receives and holds a first brightness signal B1 of the aimed at first spot. The first brightness signal B1 is passed on to the exposure change circuit 6 in which the first brightness signal B1 is changed, for example, to a changed signal $B1 - \Delta B$ in the above described manner by the actuation of up switch 22. When the changing is completed, the memory MO holds the changed brightness signal B1−ΔB. At this moment, the segment indicator 11 indicates the F-stop number based on the changed brightness signal B−ΔB, and the dot indicator LE is so actuated as to light one dot which is off from the center dot LEA. The degree how far the dot is off from the center dot LEA is determined by the value A+B1−(B1−ΔB)=A+ΔB calculated in the variation calculation circuit CA0. As an example, it is assumed that in this case, a dot indicated by a reference character LEΔB shown in FIG. 3 is lit.

Then upon turning on of the memory switch 24, the flip-flop F/F1 is turned to a set condition producing a low level signal from its $\overline{Q}$ terminal. This low level signal prevents the renewal of a changed signal in the memory MO. Thus, the memory MO continues to hold the changed brightness signal B1−ΔB regardless of any new data set up in the exposure change circuit 6. The turning on of the memory switch 24 also causes the counter C2 to count up to one. Thus, the counter C2 produces a signal representing one from its terminal O3. This signal is applied to the memory unit selection circuit F for selecting the first memory unit M1. Immediately thereafter, the delay circuit D1, which has been actuated by the on signal of the switch 24, produces a signal to the memory unit selection circuit 5 causing the memory unit selection circuit 5 to transmit the first brightness signal B1 from the latch 4 to the selected memory unit M1. The first brightness signal B1 stored in the memory unit M1 is applied to the variation calculation circuit CA1, and is also applied with the changed brightness signal B1−ΔB from the memory MO and data A from the data setting circuit DA1. Accordingly, the variation calculation circuit CA1 carries out the calculation of A+B1−(B1−ΔB)=A+ΔB, which is the same calculation as that carried out in the variation calculation circuit CA0 in the previous step. Since the AND gate AN11 is being held open by a high level signal obtained from the decoder DC30, which has been actuated by the signal from the counter C2, the variation calculation circuit CA1 supplies the calculated data A+ΔB to the decoder DC1 for actuating the dot indicator LE. It is to be noted that, since the data A+ΔB applied to the decoder DC1 is equal to that applied to the decoder DC0, the decoder DC1 is so actuated as to light the same dot as that lit by the decoder DC0, i.e., the dot LEAΔB. Thus, the first closing operation of the memory switch 24 gives no change in the dot indicator LE. Thus, it can be said that the closing operation of the memory switch 24 in the above described operation memorizes the calculation carried out in the variation calculation circuit CA0 using the data A, B1 and B1−ΔB.

Then, while aiming at a second spot in the object, and when the light measuring switch 21 is turned on for the second time, a second brightness signal B2 of the second spot is transmitted to the latch 4 which accordingly erases the old brightness signal B1 and holds the new brightness signal B2. The brightness signal B2 is applied from the latch 4 to the exposure change circuit 6 and also to the variation calculation circuit CA0. In the exposure change circuit 6, the signal is renewed from B1−ΔB to B2, but the renewed signal B2 will not be transmitted to the memory MO since the AND gate A2, receiving a low level signal from the flip-flop F/F1, prevents the transmittal of the completion signal from the terminal 66 of the circuit 6 to the clock terminal CL of the memory MO. In the variation calculation circuit CA0, to the data A from the data setting circuit DA1 is added the second brightness signal B2 from the latch 4 and from the sum is subtracted the changed brightness signal B1−ΔB from the memory MO. Accordingly, variation calculation circuit CA0 produces a variation data V1 which can be expressed as follows:

$$V1 = A + B2 - (B1 - \Delta B) \quad (2)$$
$$= (A + \Delta B) + (B2 - B1)$$

The data V1 from the variation calculation circuit CA0 actuates the dot indicator LE to light another dot, and in this case, it is assumed that a dot LEV1 shown in FIG. 3 is lit.

When the data V1 from the variation calculation circuit CA0 is compared with the data from the variation calculation circuit CA1, the difference therebetween is B2−B1 which is substantially equal to the difference of the brightness between the first and second spots. This difference results in a density difference on the reversal film represented by the blocks indicated by the dots LEΔB and LEV1. This can be understood that the dot LEV1 shows how dark or light the density of the second spot on a reproduced film will be if a photograph of the object is taken with the exposure value determined by the changed brightness signal B1−ΔB.

It is to be noted that the segment indicator 11 is still showing the F-stop number determined by the previously measured and changed brightness signal B1−ΔB, even after the measurement of the second spot.

Thereafter, when the memory switch 24 is turned on for the second time, the second brightness signal B2 in the latch 4 is stored in the second memory unit M2 in a similar manner as that described above, causing the variation calculation circuit CA2 to carry out the same calculation as that carried out in the circuit CA0 using the data A, B1−ΔB and B2. Thus, the variation calculation circuit CA2 produces data V1 that actuates the dot indicator LE to light the dot LEV1.

By carrying out the above described operation repeatedly, it is possible to measure other spots on the object and to indicate how the measured spots will turn out on the film through the dot indicator LE. Accordingly, the dot indicator LE can be so actuated as to light a plurality of dots at the same time, showing the distribution of density which will be obtained on a reproduced film at spots corresponding to the measured spots. When it is required to shift reproduced tone levels, i.e., to alter the diodes to be lit altogether in a right- or left-hand direction by a desired number, the following operation should be taken.

First the reset switch 25 is turned on. Accordingly, the flip-flop F/F1, which has been in the set condition, is turned to reset condition, producing a high level signal from its $\overline{Q}$ terminal. The turning on of the reset switch 25 also resets the counter C1. At this moment, the exposure change circuit 6 receives a brightness signal which has been obtained in the final spot measuring operation. For example, when assuming that there have been carried out two spot measuring operations corresponding to those described above, the brightness signal obtained in the final measuring operation is B2. Accordingly, the exposure change circuit 6 in this case is holding the brightness signal B2. Thus, when the flip-flop F/F1 is turned to the reset condition, the AND gate A2 opens to allow the signal from the terminal 66 to the clock terminal CL of the memory MO. Accordingly, in the memory MO, the old changed brightness signal $B1-\Delta B$ is erased and a new brightness signal B2 is stored. This signal B2 is used in the calculation circuit 9 which accordingly produces a new F-stop number capable of reproducing the second spot as a half-tone on the film. The calculated F-stop number is displayed through the segment indicator 11. The signal B2 held in the memory MO is also applied to each of the variation calculation circuits CA0 to CAn. In the variation calculation circuits CA0 and CA2, a calculation $A+B2-B2=A$ is carried out, and in the variation calculation circuit CA1, a calculation $A+B1-B2$ is carried out. Accordingly, data produced from the variation calculation circuits CA0 and CA2 actuate the dot indicator LE in such a manner as to light the center dot LEA, i.e., to shift the light dot two steps towards highlight tone from the dot LEV1. Similarly, data produced from the variation calculation circuit CA1 actuates the dot indicator LE in such a manner as to shift the lit dot two steps towards highlight tone from the dot LE$\Delta$B, i.e., to light a dot LE1m.

In this manner, the operator not only can foresee how dark or light the density will be on a photographed film at spots corresponding to the measured spots in the object, but also can determine an appropriate exposure parameter (according to the above embodiment, the exposure parameter of aperture value is the F-stop number) for creating a photograph with an intended density at measured spots.

Thereafter, when the clear switch 26 is turned on, the counter C2 is reset to zero, and accordingly, the output O3 of the counter C2 produces a binary coded signal representing zero. Thus, the decoder DC30 produces no high level signal from any one of its outputs 001 to 00n, resulting in de-actuation of AND gates AN11 to AN1n. Thus, the calculated variations produced from the variation calculation circuits are intercepted at the AND gates AN11 to AN1n to turn off all the dots which have been lit. Therefore, when the clear switch 26 is turned on, it appears that the memory units M1 to Mn are cleared to erase the stored brightness signal. Thereafter, when the operator again turns on the memory switch 24 for the first time, the memory unit M1 stores a new brightness signal from the latch 4, and at the same time, the output 001 of the decoder DC30 produces a high level signal. Accordingly, the variation calculated in the variation calculation circuit CA1 using the new brightness signal from the memory unit M1 is transmitted through the AND gate AN11 to the decoder DC1, thus lighting one dot.

It is to be noted that the dot indicator LE shown in FIG. 3 can be further provided with a dot LE1m at the right-hand most side for indicating over-exposure, and another dot LE11 at the left-hand most side for indicating under-exposure.

Although the above embodiment has been described such that the exposure parameter of the aperture value has been displayed through the segment indicator 11, it is possible to display other exposure parameters, such as the brightness value, exposure value or exposure time value, through the segment indicator 11. Furthermore, the exposure change circuit 6, which has been described as provided for changing the brightness signal, i.e., the exposure parameter of brightness value, can be used for changing other exposure parameter signals, such as exposure value, aperture value or exposure time value signal.

Referring to FIG. 4, there is shown a modification of the circuit arrangement shown in FIG. 2. In FIG. 4, only the sections involved in the modification are shown, so that other sections are understood as identical to those shown in FIG. 2.

The output 67 of the latch 4 is connected directly to the memory MO. The A-D conversion completion signal produced from the AND gate A1 is also applied through the AND gate A2 to clock terminal CL of the memory MO. The other input of the AND gate A2 receives the signal from $\overline{Q}$ terminal of the flip-flop F/F1. Accordingly, when the power is supplied, the POR circuit 12 produces a pulse that resets the flip-flop F/F1, and thereupon, the flip-flop F/F1 produces a high level signal from its $\overline{Q}$ terminal. Thus, the memory MO receives and stores the brightness signal B at approximately the same time when the latch 4 receives the brightness signal B from the A-D converter 3. The stored brightness signal B in the memory MO is provided to the exposure change circuit 6, in which the brightness signal B is changed to $B\pm\Delta B$ by the signals obtained from up/down counter C1. The up/down counter C1 according to this modification is reset by the closure of the clear switch 26.

After actuation of the power supply and during the closure of the light measuring switch 21, the brightness signal B produced from the A-D converter 3 is transmitted to the latch 4 and is further stored in the memory MO. Thereafter, when the memory switch 24 is turned on, the flip-flop F/F1 is set for producing a low level signal from the $\overline{Q}$ terminal. Accordingly, the memory MO accepts no further brightness signal B from the latch 4, and thus continues to hold the brightness signal B applied to the memory MO in the last light measuring operation and before the closure of the memory switch 24.

The main difference in operation between the circuit of FIG. 4 and that of FIG. 2 is the steps for changing the brightness signal B. According to the circuit of FIG. 2, the signal changing is carried out in the order of turning-on of the reset switch 25 and then turning-on of up switch 22 or down switch 23. Whereas in the circuit according to FIG. 4, the signal changing can be carried out without the step for turning the reset switch 25 on. In other words, according to the circuit of FIG. 4, the signal changing can be carried out only by the turning on of up switch 22 or down switch 23.

Referring to FIG. 5, there is shown a circuit diagram of an example for the exposure change circuit 6 shown in FIGS. 2 and 4.

A reference character PG3 designates a pulse generator for generating pulses that reset flip-flop F/F2. When the flip-flop F/F2 is reset, its Q terminal produces a high level signal which actuates a monostable multivibrator vibrator MPG10 to produce a single pulse output. The output of the monostable multivibrator MPG10, from which the single pulse is produced, is connected to a reset terminal R20 of an up/down counter C20. Thus, the counter C20 is reset by the single pulse from the monostable multivibrator MPG10. The output of the monostable multivibrator MPG10 is also connected to a delay circuit D21, which is in turn connected to a load terminal L20 of the counter C20. Thus, when the counter C20 receives a pulse at load terminal L20, the brightness signal B from the latch 4, which has been applied to the terminal 67, is loaded in the counter C20 through an input I20. The terminal 63 connected to the output terminal O1 of the up/down counter C1, is connected to the up/down terminal of the counter C20. When the voltage level at the terminal 63 is low, the counter C20 counts down the signal B received from the input terminal I20 in response to the pulses applied to clock terminal CL20 of the counter C20. On the other hand, when the voltage level at the terminal 63 is high, the counter C20 counts up the signal B received from the input terminal I20 in response to the pulses applied to clock terminal CL20 of the counter C20. The clock terminal CL20 of the counter C20 receives a train of pulses which has been produced from the pulse generator PG3, delayed by the delay circuit D20 and transmitted through AND gate A20.

A pulse produced from the monostable multivibrator MPG10 is applied to a reset terminal R21 of a down counter C21 for resetting the down counter C21. Furthermore, the output of the monostable multivibrator MPG10 is connected through the delay circuit D21 to a load terminal L21 of the counter C21. Accordingly, when the load terminal L21 receives a pulse from the delay D21, the binary coded signal from the output O2 of the counter C1, which has been applied to the terminal 64, is loaded in the counter C21 through an input I21. At this moment, a borrow terminal BR of the counter C21 is producing a high level signal. The counter C21 counts down the signal received from the input I20 in response to the pulses applied to the clock terminal CL21 of the down counter C21. The clock terminal CL21 receives pulses produced from output terminal O22 of the counter C22. The input terminal CL22 of the counter C22 receives pulses produced from the pulse generator PG3 and delayed in the delay circuit D20. The counter C22 counts pulses from the delay circuit D20, and when it has counted 5 pulses, it produces from its terminal O22 a pulse, which is applied to a clock terminal CL21 of the down counter C21. When the down counter C21 receives the pulse, it starts to count down, and when it has counted down to zero, its borrow terminal BR produces a low level signal. Accordingly, the AND gate A20 intercepts the pulses from the delay D20 to prevent the further supply of pulses to the clock terminal CL20 of the counter C20. The counter C20 then produces a signal of counted amount from its terminal O20 which is connected to the AND gate A2 through a terminal 65. The borrow terminal BR is also connected to a monostable multivibrator MPG, and when the borrow terminal BR produces a low level signal, the monostable multivibrator MPG produces a single shot pulse which is transmitted through a terminal 66 to the memory MO. Furthermore the single shot pulse from the monostable multivibrator MPG is applied to reset terminal of each of counter C22 and flip-flop F/F2 for resetting these circuits C22 and F/F2.

For example, when the signal applied to the terminal 63 is low and the signal applied to the terminal 64 represents two, the exposure change circuit 6 described above operates as follows. The counter C22 receives a train of pulses from the delay circuit D20 and when it counts five pulses, its output terminal O22 produces a pulse which is applied to clock terminal CL21 of the counter C21. By the pulse from the counter C22, the counter C21 counts down the number received from the terminal 64. Since the counter C21 at first retains the number two, there will be ten pulses applied to the counter C22 before the counter C21 counts down to zero. When the counter C21 has counted down to zero, the borrow terminal BR, which has been producing a high level signal, produces a low level signal to close the AND gate A20. In the mean time when the borrow terminal is producing a high level signal, the ten pulses produced from the delay circuit D20 is also applied through the AND gate A20 to the clock terminal CL20 of the counter C20. Accordingly, the counter C20, which has been set in a count up condition by the low level signal from the terminal 63, counts up the brightness signal B as it receives ten pulses from the AND gate A20. The counted up brightness signal, i.e., the changed brightness signal $B \pm \Delta B$, is produced from the output O20 of the counter C20, and it is applied through the terminal 65 to the memory MO. When the ten pulses are produced from the delay circuit D20, the borrow terminal BR produces a pulse which is applied through the terminal 66 and AND gate A2 to the memory MO for effecting the storing of the changed brightness signal $B + \Delta B$ in the memory MO. The pulse from the borrow terminal BR is also applied to the counter C22 and flip-flop F/F2 for resetting these circuits C22 and F/F2.

Figure 6:
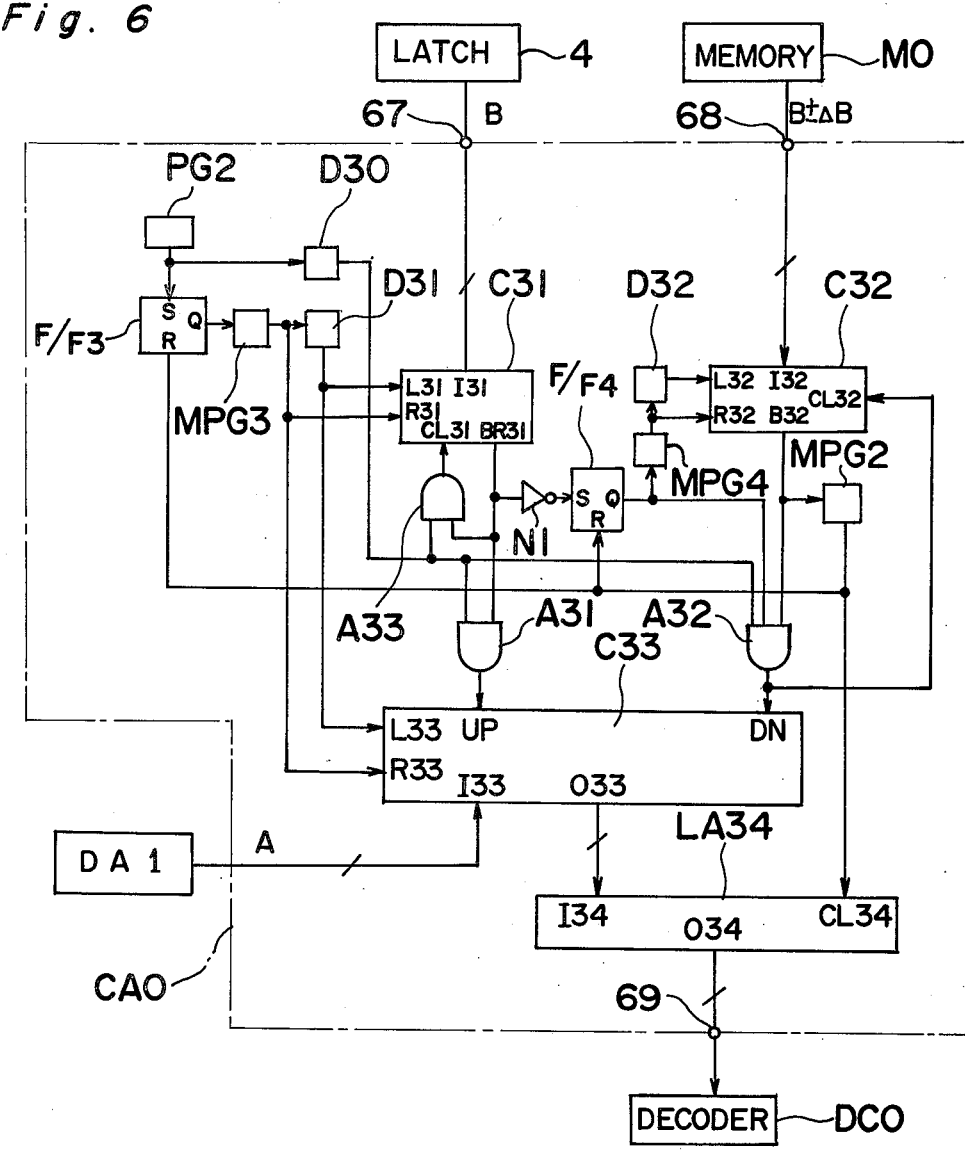
FIG. 6 is a circuit diagram showing a detail of the variation calculation circuit shown in FIG. 2.

Referring to FIG. 6, there is shown a circuit diagram which is an example of the variation calculation circuit CA0. It is to be noted that other variation calculation circuits CA1, CA2, ..., and CAn have the same structure as the circuit CA0.

A reference character C31 designates a down counter having reset terminal R31, load terminal L31, clock terminal CL31, borrow terminal BR31 and input terminal I31. When the reset terminal R31 receives a pulse, the counter C31 is reset. Then, when the load terminal L31 receives a pulse, the brightness signal B from the latch 4 is transferred to the counter C31 through the input terminal I31. At this moment, the borrow terminal BR31 of the counter C31 is producing a high level signal. The counter C31 counts down the brightness signal B as it receives a train of pulses to its clock terminal CL31, and when it has counted down to zero, the borrow terminal BR31 changes its output level from high to low.

A flip-flop F/F3 is set by a pulse received from an oscillator PG3, and when it is set, it produces a high level signal from its Q terminal. The high level signal from the Q terminal is applied to a monostable multivibrator MPG3, which produces a single shot pulse applied to the reset terminal R31 for resetting the counter C31. The pulse produced from the monostable multivibrator MPG3 is also applied to a delay circuit D31, and in turn, to the load terminal L31 of the counter C31. The clock terminal CL31 of the counter C31 is applied with a train of pulses from the oscillator PG2 through a delay circuit D30 and AND gate A33. The AND gate A33 is provided for intercepting the pulses from the delay circuit D30 to be supplied to the clock terminal CL31 of the counter C31 when the borrow terminal BR31 produces a low level signal.

A counter C33 has a reset terminal R33 for receiving a pulse from the monostable multivibrator MPG3, a load terminal L33 for receiving a delayed pulse from the monostable multivibrator MPG3 through the delay circuit D31, and an input terminal I33 for receiving the data A from the data setting circuit DA1. The counter C33 further has an up-count terminal UP, down-count terminal DN, and output terminal O33. When the reset terminal R33 receives a pulse from the monostable multivibrator MPG3, the counter C33 is reset, and then, when the load terminal L33 receives a delayed pulse from the delay circuit D31, the counter C33 is loaded with the data A from the data setting circuit DA1 through the input terminal I33. The up-count terminal UP of the counter C33 receives a train of pulses produced from the oscillator PG2 through the delay circuit D30 and AND gate A31 as the borrow terminal BR31 of the counter C31 is producing a high level signal. It is to be noted that number of pulses to be applied to the up-count terminal of the counter C33 is equal to the number of pulses applied to the clock terminal CL31 of the counter C31. Accordingly, the number of pulses applied to the up-count terminal UP of the counter C33 is identical to the brightness signal B applied to the input terminal I31 of the counter C31. As the counter C33 receives the pulses through its up-count terminal UP, it counts up the loaded data A for effecting the addition of the data A and the brightness signal B.

A flip-flop F/F4 includes set terminal S, reset terminal R and Q terminal, in which the set terminal S is connected through an inverter IN to the borrow terminal BR31 of the counter C31. When the borrow terminal BR31 produces a low level signal, the flip-flop F/F4 is turned to a set condition for producing a high level signal from its Q terminal. The high level signal produced from the Q terminal of the flip-flop F/F4 is applied to a monostable multivibrator MPG4, which accordingly produces a single shot pulse, and the single shot pulse from the multivibrator MPG4 is applied to a reset terminal R32 of a counter C32 and also to a delay circuit D32 and in turn to a load terminal L32 of the counter C32. When the counter C32 is applied with the single shot pulse to its load terminal L32, the changed brightness signal B±ΔB from the memory MO is loaded in the counter C32 through a terminal 68 and a load terminal L32 of the counter C32. At this moment, a borrow terminal BR32 of the counter C32 is producing a high level signal. The changed brightness signal B±ΔB loaded in the counter C32 is counted down, as the counter C32 receives a train of pulses from the oscillator PG2 through delay circuit D30 and AND gate A32 to its clock terminal CL32. When the counter C32 has counted down to zero, the borrow terminal BR32 of the counter C32, which has been producing a high level signal, produces a low level signal. The AND gate A32 has three inputs which are connected to the borror terminal BR32 of the counter C32, Q terminal of the flip-flop F/F4 and delay circuit D30, and when the signals from the borrow terminal BR32 and Q terminal are a high level signal, the delayed pulses from the delay circuit D30 pass through the AND gate A32 and are applied to down-count terminal DN of the counter C33. The counter C33 counts down, as it receives pulses from the AND gate A32, the sum of data A and brightness signal B, effecting the subtraction of changed brightness signal B±ΔB from the sum (A+B).

After having counted down to zero in the counter C32 and when the borrow terminal B32 produces a low level signal, the monostable multivibrator MPG2 produces a single shot pulse for resetting the flip-flops F/F3 and F/F4. Moreover, the pulse from the multivibrator MPG2 is applied to clock terminal CL34 of a latch LA34 for receiving and holding the calculated result of the counter C33, i.e., the calculated variation A+B−(B±ΔB), in the latch LA34. The calculated variation is then produced from output terminal O34 of the latch 34, and is applied to the decoder DC0 through a terminal 69.

Figure 7:
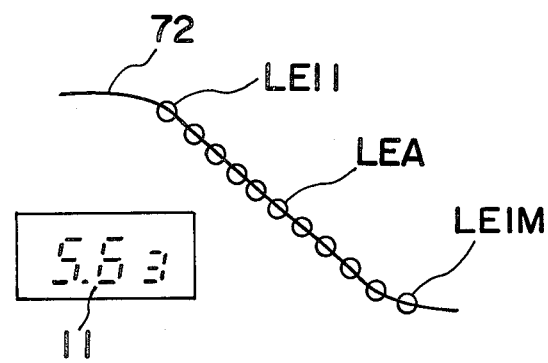
FIG. 7 is a front view of a display unit showing another specific arrangement of a dot indicator and a segment indicator.

Referring to FIG. 7, there is shown a modification of dot indicator LE. Instead of arranging the dots in alignment with the density chart 70, the dots in this modification are arranged in alignment with a curve 72 representing the film characteristic. For example, the and ordinate of the curve can be understood as representing the amount of given exposure and the density for the reproduced image, respectively.

Since the exposure indicator according to the present invention can indicate the density in images in a reproduced film for the measured portion in the object with respect to any possible value of exposure parameter e.g. F-stop number, it is possible to choose, without any skill, an appropriate value which can reproduce the film with the intended density.

It is to be noted that the circuit arrangement of FIGS. 2, 4, 5 and 6, which have been described as formed by circuit elements of counters, flip-flops, etc. using digital signals, can be formed by a micro-computer. In this case, a portion of light measuring circuit 1 (particularly a portion of A-D converter), setting circuit C1, exposure change circuit 6, exposure calculation circuit 9 and variation calculation circuit CA should preferably be arranged in such a manner as to be operated by the orders obtained from a CPU and also from a ROM controlled by a RAM of the micro-computer. Furthermore, the memory M and other memories can be formed by a RAM of the micro-computer. And, the segment display 11 and dot display LE can be connected to output port of the micro-computer.

It is also to be noted that the dots, which have been described as defined by light emitting diodes, can be formed by liquid crystal arranged in a known manner.

It is further to be noted that the exposure calculation circuit 9, which has been described as provided for calculating an F-stop number by using given values of brightness of the measured portion, film speed and shutter speed, can be so arranged as to calculate an exposure value EV by using given values of brightness and film speed, or as to calculate shutter speed by using given values of brightness, film speed and aperture size. In this case, it is necessary to rearrange the segment indicator 11 capable of displaying exposure value EV or shutter speed.

It is still further to be noted that the exposure indicator according to the present invention can be applied to any known light meter, e.g., an integrated type reflected-light meter which reads total scene brightness within its area of view or angle of coverage, or an incident-light meter which measures the light sources themselves from the point where the object is located.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:
1. An exposure indicator comprising:
light measuring means including a light receiving element for producing an electrical signal as a function of the light received by said light receiving element;
change means for changing the electrical signal obtained from the light measuring means and for producing a changed signal;
setting means provided in association with said change means for setting an amount of change of the electric signal;

first indicator means for indicating a value of an exposure parameter based on said changed signal;

means for determining, based on said amount of change, the density of a photographic sensitized material that is anticipated to be reproduced when a photograph is taken for the measured light with an exposure condition in compliance with the value of the exposure parameter indicated by said first indicator; and second indicator means for indicating the determined film density.

2. An exposure indicator as claimed in claim 1, wherein said first indicator means comprises a segment indicator means for indicating said value of the exposure parameter in a numerical representation, said exposure parameter being any one of exposure value, aperture value, shutter speed, and brightness.

3. An exposure indicator as claimed in claim 2, wherein said first indicator means further comprises an exposure calculation circuit for calculating said exposure parameter based on said changed signal.

4. An exposure indicator as claimed in claim 1, wherein said light measuring means further includes means for generating, as said electric signal, a voltage signal having a level proportional to the logarithm of the light intensity incident on said light receiving element.

5. An exposure indicator as claimed in claim 1 further comprising a storing means for storing said changed signal and wherein said determining means includes means for detecting the difference between the stored changed signal and said electrical signal from said light measuring means.

6. An exposure indicator as claimed in claim 1, wherein said second indicator means comprises a density chart showing different tones of reproduced film and a plurality of dots each adapted to emit light for the indication of particular tone.

7. An exposure indicator as claimed in claim 1, wherein said second indicator means includes a plurality of dots aligned along a curve representing given exposure-reproduced film density characteristics, each dot being adapted to emit light selectively for the indication of a particular point on said curve.

8. An exposure indicator as claimed in claim 7, wherein said determining means further comprises difference calculation means for calculating the difference between said electrical signal from said light measuring means and said changed signal, a calculated difference being used for actuating one of said plurality of dots.

9. An exposure indicator as claimed in claim 8, further comprising memory means for storing the electric signal from said light measuring means, said difference calculation means being capable of calculating, at the same time, the difference between every said stored signal and said changed signal.

10. An exposure indicator as claimed in claim 9, wherein said memory means includes a plurality of memory units for storing a plurality of electric signals from said light measuring circuit and said difference calculation means includes a plurality of calculator units for calculating the difference between the changed signal and each of said stored signals.

11. An exposure indicator as claimed in claim 8 further comprising a constant signal producing means connected to said difference calculation means for producing a signal representing a constant value, said calculated difference and said constant value being added with each other and when said calculated difference is zero, a dot indicating a half-tone being actuated.

12. An exposure indicator as claimed in claim 6 or 7, wherein said dots are defined by light emitting diodes.

13. An exposure indicator as claimed in claim 6 or 7, wherein said dots are defined by liquid crystal.

14. An exposure indicator as claimed in claim 1 wherein said second indicator includes a plurality of indicator elements, said determining means being adapted to selectively activate said indicator elements for the indication of the anticipated density of the photographic emulsion material.

15. An exposure indicator comprising:

light measuring means including a light detecting element for producing an electric signal as a function of the measurement of the light received by said light receiving element;

setting means manually operable for setting a desired amount of change and generating a change signal representative thereof;

change means for changing the electrical signal in response to said change signal such that the changed signal represents a light measurement value changed by an amount set by said setting means;

first indicator means for indicating a value of an exposure parameter in response to the electrical signal changed by said change means;

determining means for determining, from the electrical signal and the changed signal, the anticipated density of reproduction on a film when the film is exposed to the measured light with an exposure condition in compliance with the value of the exposure parameter indicated by said first indication means; and second indicator means for indicating the anticipated density determined by said determining means.

16. An exposure indicator as claimed in claim 15, wherein said first indicator means comprises a segment indicator means for indicating said value of the exposure parameter in a numerical representation, said exposure parameter being any one of exposure value, aperture value, shutter speed, and brightness.

17. An exposure indicator as claimed in claim 16, wherein said first indicator means further comprises an exposure calculation circuit for calculating said exposure parameter based on said changed signal.

18. An exposure indicator as claimed in claim 15, wherein said second indicator means comprises a density chart showing different tones of reproduced film and a plurality of dots each adapted to emit light for the indication of a particular tone.

19. An exposure indicator as claimed in claim 15, wherein said second indicator means comprises a plurality of dots aligned along a curve representing a density of reproduced film, each dot adapted to emit light for the indication of a particular point on said curve.

20. An exposure indicator as claimed in claim 15, wherein said second indicator means includes a plurality of indicator elements, said determining means being adapted to selectively activate said indicator elements for the indication of the anticipated density of the photographic emulsion material.

21. An exposure indicator as claimed in claim 20, wherein said determining means further comprises difference calculation means for calculating the difference between said electrical signal from said light measuring means and said changed signal, a calculated difference being used for actuating one of said plurality of dots.

22. An exposure indicator as claimed in claim 21, wherein further comprising memory means for storing the electrical signal from said light measuring means, said difference calculation means being capable of calculating, at the same time, the difference between every said stored signal and said changed signal.

* * * * *